(12) United States Patent
Amadeo et al.

(10) Patent No.: US 8,348,171 B2
(45) Date of Patent: Jan. 8, 2013

(54) SMARTCARD INTERCONNECT

(75) Inventors: Paul Amadeo, San Diego, CA (US);
Jose Flores, Chula Vista, CA (US);
Robert Kraft, Escondido, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 13/030,993

(22) Filed: Feb. 18, 2011

(65) Prior Publication Data

US 2011/0204147 A1 Aug. 25, 2011

Related U.S. Application Data

(60) Provisional application No. 61/306,431, filed on Feb. 19, 2010.

(51) Int. Cl.
*G06K 19/06* (2006.01)

(52) U.S. Cl. ........................................ 235/492

(58) Field of Classification Search .................... 235/492
See application file for complete search history.

(56) References Cited

U.S. PATENT DOCUMENTS

| 5,649,352 A | 7/1997 | Gustafson |
| 6,091,332 A | 7/2000 | Eberhardt et al. |
| 2008/0203173 A1* | 8/2008 | Baba .............................. 235/492 |
| 2008/0283618 A1* | 11/2008 | Pueschner et al. ............ 235/492 |
| 2011/0068176 A1* | 3/2011 | Bashan et al. ................ 235/492 |

FOREIGN PATENT DOCUMENTS

| DE | 102007022615 A1 | 11/2008 |
| DE | 102008016274 A1 | 10/2009 |

OTHER PUBLICATIONS

International Search Report for International Application No. PCT/US2011/025548 dated Jun. 7, 2011, 5 pages.

\* cited by examiner

*Primary Examiner* — Seung Lee
(74) *Attorney, Agent, or Firm* — Kilpatrick Townsend & Stockton LLP (57) ABSTRACT

A smart card inlay and method for assembling the same are provided. The method includes attaching a first trace to a substrate, attaching a second trace to the substrate, attaching an antenna wire to the substrate, coupling a first end of the antenna wire to a first area of the first trace, and coupling a second end of the antenna wire to a first area of the second trace. A second area of the first trace and a second area of the second trace are configured to be coupled to an integrated circuit (IC) or IC module, and the first area of the first trace is located away from the second area of the first trace and the first area of the second trace is located away from the second area of the second trace.

21 Claims, 8 Drawing Sheets

SMARTCARD INTERCONNECT

This application claims the benefit of U.S. Provisional Application No. 61/306,431, filed Feb. 19, 2010, entitled "Smart Card Interconnect," which is hereby expressly incorporated by reference in its entirety for all purposes.

BACKGROUND

Coil antennas are commonly used in contactless smart cards. Contactless smart card antennas can be manufactured with etched or printed antennas. Smart card antennas can also be formed using round wire using ultrasonics or thermal compression to embed the wire into a plastic substrate. Regardless of how the antennas are formed, the antennas need to be created high precision and/or be tuned to a specific inductance. The coil antenna is then attached to and integrated circuit (IC) module, e.g., via terminal areas on the IC module. Attaching the wire ends to a delicate IC module has proven to be a difficult task because the IC module can be damaged while the antenna coil is being attached to the terminal areas of the IC module. Different sized IC modules can also require redesign of the entire coil antenna due to the length of the antenna wire changing in order to be attached to a larger or smaller IC module.

SUMMARY

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In one embodiment, an inlay for a smartcard, includes a substrate, a first trace attached to the substrate a second trace attached to the substrate and an antenna with a first end and a second end. The first end of the antenna is coupled to a first area of the first trace, and the second end of the antenna is coupled to a first area of the second trace. A second area of the first trace and a second area of the second trace are configured to be coupled to an integrated circuit (IC) or IC module, and the first area of the first trace is located away from the second area of the first trace and the first area of the second trace is located away from the second area of the second trace.

In another embodiment, a method for assembling an inlay of a smartcard includes attaching a first trace to a substrate, attaching a second trace to the substrate, attaching an antenna wire to the substrate, coupling a first end of the antenna wire to a first area of the first trace, and coupling a second end of the antenna wire to a first area of the second trace. A second area of the first trace and a second area of the second trace are configured to be coupled to an integrated circuit (IC) or IC module, and the first area of the first trace is located away from the second area of the first trace and the first area of the second trace is located away from the second area of the second trace.

Items and/or techniques described herein may provide one or more of the following capabilities. Traces can be attached to a carrier strip to make pre-formed singulated carriers, and then attached to smart card inlays during down time of an assembly line for manufacturing smartcards. A sheet of smart card inlays (e.g., a sheet of 80 or 100 cards) with antennas already formed and connected to the traces can be made in advance and then an IC module can be attached to the traces. Thus, the more delicate work of forming the antennas is already completed before the IC modules are attached. The traces can be sized to fit multiple IC modules and therefore provide flexibility in which IC modules are used with the smart card inlays.

The features, objects, and advantages of embodiments of the disclosure will become more apparent from the detailed description set forth below when taken in conjunction with the drawings. In the drawings, like elements bear like reference labels. Various components of the same type may be distinguished by following the reference label with a dash and a second label that distinguishes among the similar components. If only the first reference label is used in the specification, the description is applicable to any one of the similar components having the same first reference label irrespective of the second reference label.

DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1A:
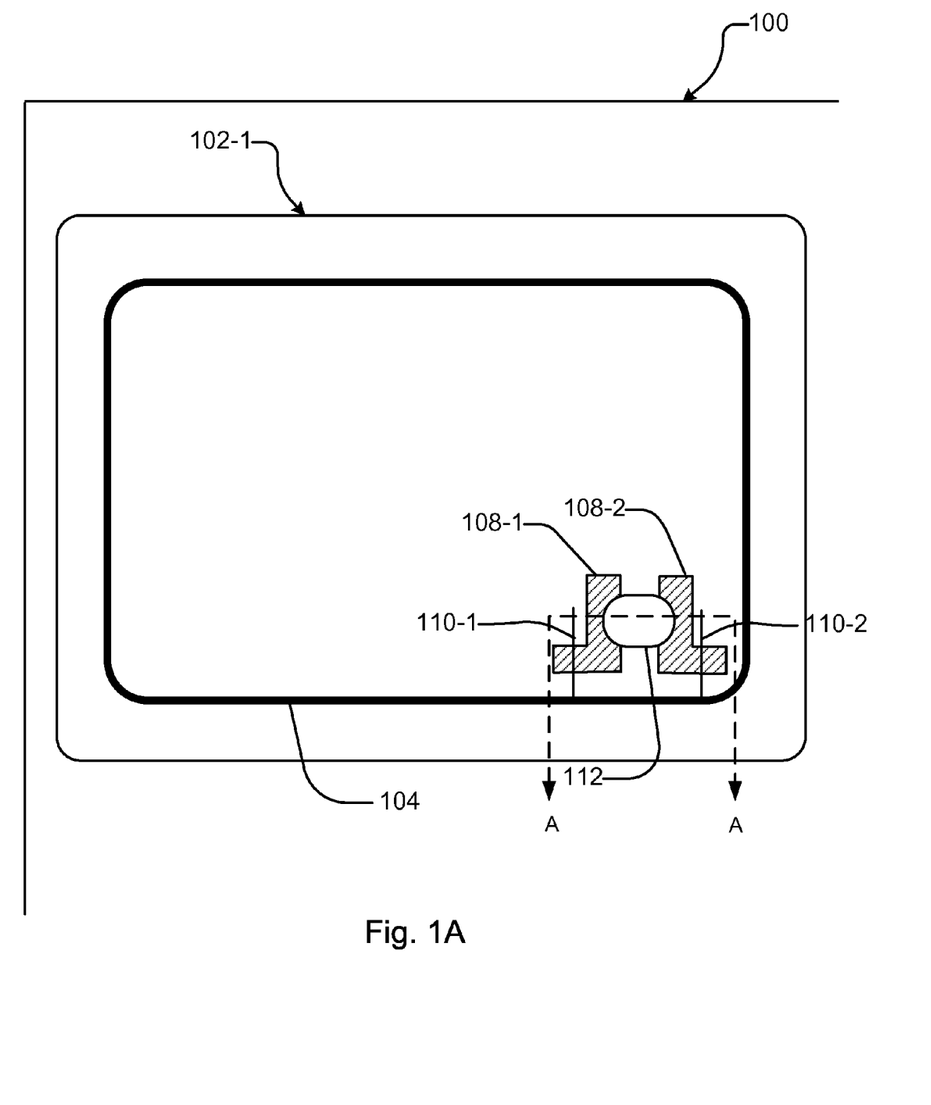
FIG. 1A depicts a example of a smartcard inlay in accordance with the disclosure.

Referring initially to FIG. 1A, an embodiment of a smartcard inlay 102-1 formed on a substrate sheet 100 is shown. This embodiment has a wire antenna 104 that could be embedded into the sheet 100 or mandrel wound in various embodiments. The substrate 100 can be made of a plastic such as PET or PVC or paper. There is a first trace 108-1 and a second trace 108-2 on the substrate 100. These traces 108 can be etched, printed or silkscreened onto the substrate 100. The traces 108 can be adjacent to a cutout formed in the substrate 100 that at least partially accepts an integrated circuit (IC) or IC module 112. The cutout can also be formed in an upper or lower layer, not shown, that covers the substrate 100 and the cutout at least partially accepts the IC module 112. The cutout can be omitted entirely if a layer covering the substrate 100 and the IC module 112 is formed by controlled lamination that causes the upper layer material to flow over the IC module 112, resulting in a flat card surface. The term IC module is used herein, but in each instance a bare IC, multi-chip module or other assembly could also be used.

Antenna wire leads 110-1 and 110-2 extend from ends of the wire antenna 104 and extend over the areas where the traces 108-1 and 108-2, respectively, are located. The traces 108 could have solder bumps for mounting the antenna 104 and/or the IC module 112 through a heating process or soldering process. The wire leads 110 can be embedded into the substrate 100 in areas outside of the traces 108 and not embedded, e.g., allowed to lie on the substrate 100, in the areas where the traces 108 are located. This will prevent damage of the traces 108 during the antenna embedding process, if the traces are already formed on the substrate 100.

The IC module 112 in this example partially overlays the traces 108 outside of the cutout, if any cutout is present. Where there is overlap, the IC module 112 can be electrically connected to the traces 108, e.g., by soldering a lead frame of the IC module 112 to the traces 108, to indirectly couple any attached antenna 104 to the IC module 112. The IC module 112 can be connected to the traces 108 before or after the antenna 104 is attached to the substrate 100 and/or the traces 108. In this embodiment, the IC module 112 is not directly connected to the antenna 104.

The antenna 104 could be mandrel wound or embedded into the substrate 100. The antenna 104 is connected to the traces 108 via the wire leads 110 and neither wire lead 110-1 or 110-2 is connected directly to the IC module 112. A mandrel wound antenna 104 could be embedded into the substrate 100 all at once before or after connection with the traces 108. The antenna 104 has the one end connected to the first trace 108-1, wound while embedding into the substrate 100 next, and the other end connected to the second trace 108-2 last; or any permutation of the sequence of these three steps could be done in various embodiments.

When a cutout is formed in the substrate 100, this could be done before or after the traces 108 are applied to the substrate 100. The traces 108 could have other shapes around the cutout, but in any event, they are electrically isolated from each other. The cutouts could be done to a whole sheet having a number of inlays. Similarly, the traces 108 could be applied to a whole sheet at once. Other traces 108 could be applied to the substrate for other antennas or other IC modules in various embodiments.

The dimensions of the traces 108 depends on the size of the IC module 112 and the width of the antenna wire leads 110. Typically, lead frame flanges of the IC module 112 are about 2 mm where the lead frame attaches to the traces 108. The diameter of the wire is about 0.004 inches (4 mils) or 0.1 mm. The lower portion of the traces 108, where the wire leads 110 attach, is typically about 2 to 10 times as wide as the antenna wire 104, or about 2 mm to about 10 mm. The upper portion of the traces 108, where the IC module 112 attaches, is typically at least as wide as the lead frame flanges or about 1 mm to about 4 mm. The size of the traces 108 will affect the inductance of the whole antenna, including the antenna wire 104, the wire leads 110 and the traces 108, but the length of the antenna wire can be adjusted to compensate for the inductance of the traces 108.

Figure 1B:
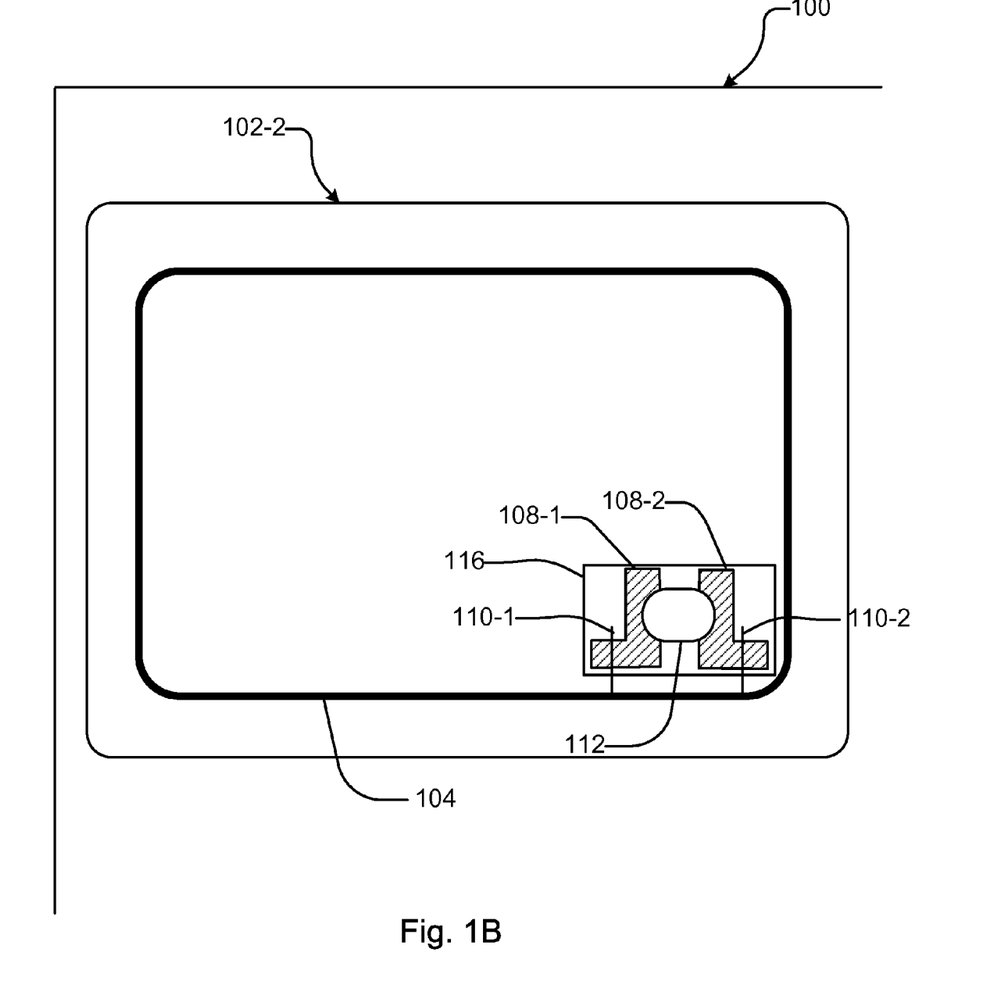
FIG. 1B depicts another example of a smartcard inlay in accordance with the disclosure.

With reference to FIG. 1B, another embodiment of the smartcard inlay 102-2 is shown. This embodiment has the traces 108 formed on a singulated carrier 116. The singulated carrier 116 could be plastic, circuit board, kapton or other tape. The singulated carrier 116 could be configured to allow pick and place machines for automated assembly. The singulated carrier 116 could be glued, heat welded or have an adhesive backing to allow placement on the substrate 100. The singulated carrier 116 could have solder bumps for the antenna 104 and/or the IC module 112.

Some embodiments place the singulated carrier 116 on the substrate 104 first before connecting the IC module 112, while others connect the singulated carrier 116 to the IC module 112 before that assembly is connected to the substrate 100. One embodiment connects a mandrel wound antenna 104 to the singulated carrier 116 prior to that assembly being attached to the substrate 100. The singulated carrier 116 could be placed on the substrate 100 before a cutout is made, if a cutout is present, in both the singulated carrier 116 and the substrate 104. Other embodiments have a cutout in the singulated carrier 116 that is matched to a cutout in the substrate 104 or where the cutout will later be formed in the substrate 104. Other embodiments have no cutout.

The singulated carrier 116 could be formed in a sheet to match a sheet of substrates so that multiple singulated carriers 116 can be mated with the sheet of substrate at once. There could be alignment markings on the singulated carrier 116 or sheet of the singulated carriers 116 to ease alignment. Some embodiments use cutouts in the substrate 100 or sheet of substrate 100 for alignment with the singulated carrier 116 or sheet of singulated carriers 116.

Figure 2:
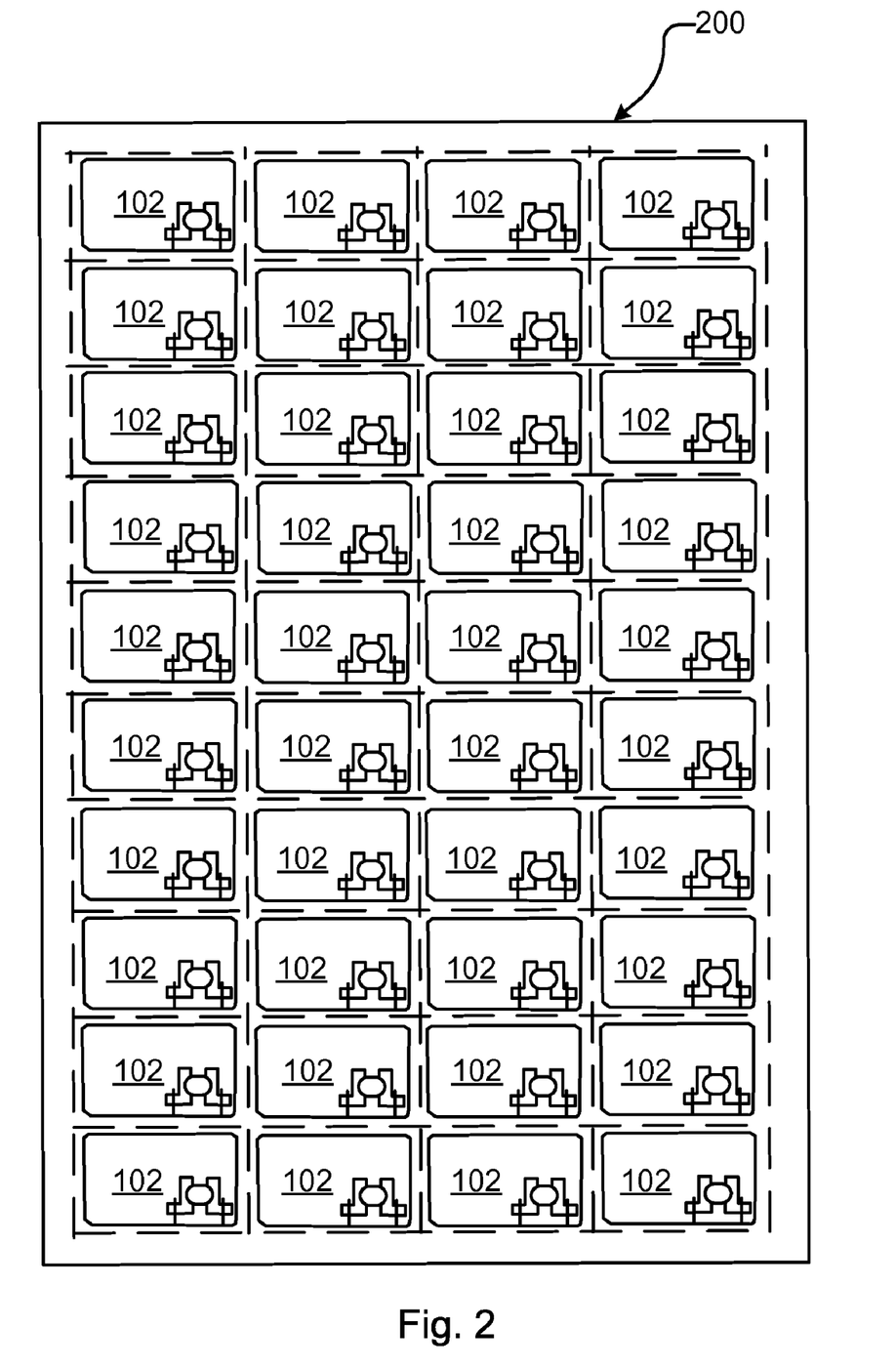
FIG. 2 depicts an example of a sheet of smartcard inlays in accordance with the disclosure.

Referring next to FIG. 2, a sheet 200 of smartcard inlays 102 is shown. Any number of smartcard inlays 102 could be formed in the sheet 200. The antennas 104 could be embedded or placed sequentially in the sheet 200. The traces 108) could be formed on a mating sheet or applied to the sheet 200. The sheet 200 could be formed with cutouts, antennas 104 and traces 108 before any IC modules 112 are attached. The antennas 104 could be attached to the traces 108 for all inlays prior to attachment of any IC module 112.

Figure 3A:
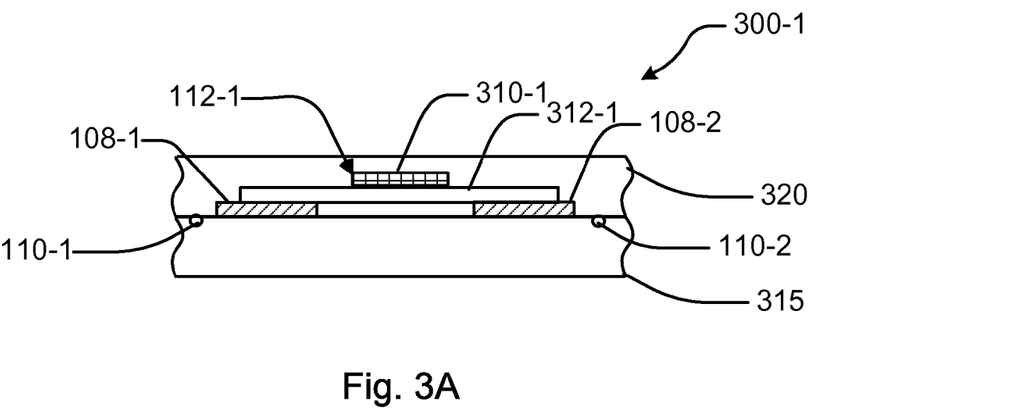
FIGS. 3A, 3B, 3C and 3D depict examples of cross-sectional views of finished smartcards including smartcard inlays in accordance with the disclosure.

FIGS. 3A, 3B, 3C and 3D depict various cross-sectional views, at the plane cut line A-A of FIG. 1A, of finished smartcards including the smartcard inlays of FIGS. 1A and 1B. Referring to FIG. 3A, a first cross section 300-1 includes two layers. The traces 108-1 and 108-2 are formed on a substrate layer 315, where the substrate 315 is equivalent to the substrate 100 of FIGS. 1A and 1B. The traces 108 can be etched, printed or silk-screened onto the substrate 315 or the traces 108 can be formed on the singulated carrier 116 (not shown in FIG. 3A) that is attached to the substrate 100. The wire leads 110-1 and 110-2 are shown embedded into the substrate 315. As discussed above, the wire leads 110 could be attached via adhesive to lie above the substrate 315, As illustrated, the cross section 300-1 does not show the portion of the traces 108 where the wire leads 110 are attached. At the attachment portions, the wire leads could be above or below the traces 108, but not embedded, at least not entirely in the substrate, in order to provide electrical contact.

The IC module 112-1 includes an IC chip 310-1 and a lead frame 312-1. The IC chip 310-1 can include an integrated circuit (IC) encased within an encasement (e.g., made of epoxy). As an alternative to an encased IC coupled to a lead frame 312, some IC modules 112 could be simply an IC attached to a carrier including two isolated conductive portions electrically coupled to ball bonds of the IC. Isolated ends of the lead frame 312-1 are electrically coupled to the traces 108-1 and 108-2, respectively. The traces 108-1 and 108-2 electrically couple the lead wires 110-1 and 110-2 indirectly to respective ends of the lead frame 312-1.

An upper finishing layer 320 covers the IC module 112-1, the traces 108 and the substrate 315. In this case, there is no cutout portion in either the substrate 315 or the upper layer 320. The upper layer 320 can be a laminate that is formed in a controlled lamination cycle that causes the laminate to flow over the IC module 112-1 and the traces 108 and results in a flat exterior surface of the upper layer 320.

Figure 3B:
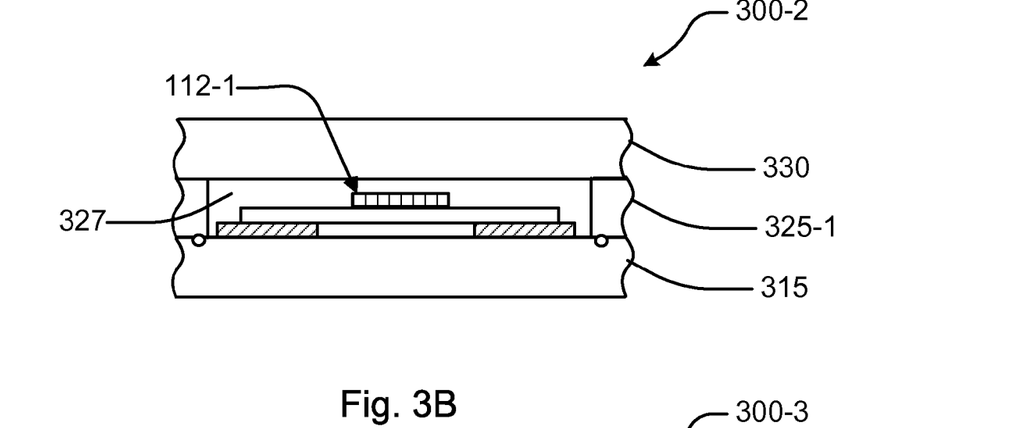

Referring next to FIG. 3B, a second cross section 300-2 is illustrated. The second cross section 300-2 is similar to the first cross section 300-1 of FIG. 3A in that it includes an IC module 112-1 attached to traces 108-1 and 108-2, where the traces 108 are attached to a substrate 315 and lead wires 110 are embedded into the substrate 315. In contrast to the first cross section 300-1, the second cross section 300-2 includes an intermediate layer 325-1 that includes a cutout area 327 configured to allow insertion of the IC module 112-1. The intermediate layer 325-1 can be a plastic layer such as PVC or PET. An upper layer 330 is attached to the intermediate layer 325-1 to encase the IC module 112-1 and the traces 108 within the cutout area 327. The substrate 315, the intermediate layer 325-1, and the upper layer 330 can be attached with adhesives, or melted together. The upper layer 330 could also be a laminate layer, which would tend to flow into and fill the cutout area 327.

Figure 3C:
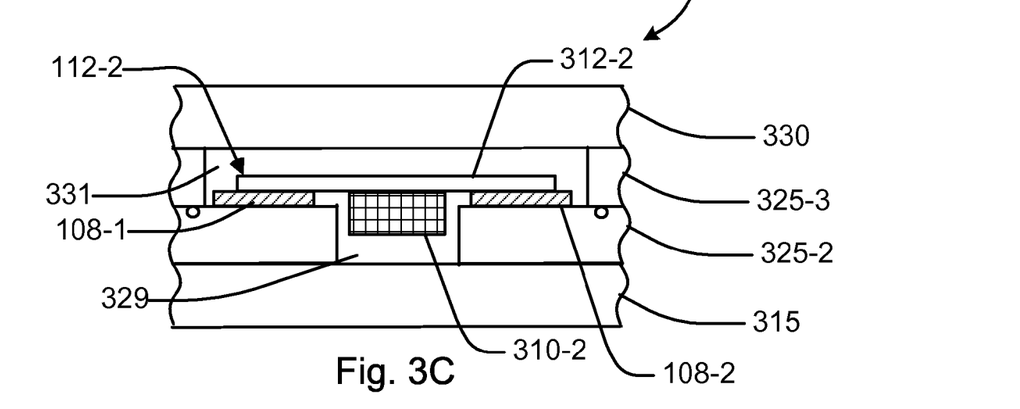

Referring next to FIG. 3C, a third cross section 300-3 is composed of the substrate 315, a first intermediate layer 325-2, a second intermediate layer 325-3 and the upper layer 330. An IC module 112-2 is attached to traces 108-1 and 108-2 attached to the first intermediate layer 325-2. The IC module 112-2 includes a lead frame 312-2 and an IC chip 310-2 coupled to the lead frame 312-2, but the IC module 112-2 is inverted, when compared to the IC module 112-1, when attached to the traces 108. A first cutout 329 is formed in the first intermediate layer 325-2 to allow insertion of a portion of the IC chip 310-2. A second cutout 331 is formed in the second intermediate layer 325-2 to allow insertion of the traces 108 and the lead frame 312-2. The upper layer 330 encases the IC module 112-2 and the traces 108 within the cavities defined by the first and second cutouts 329 and 331.

Figure 3D:
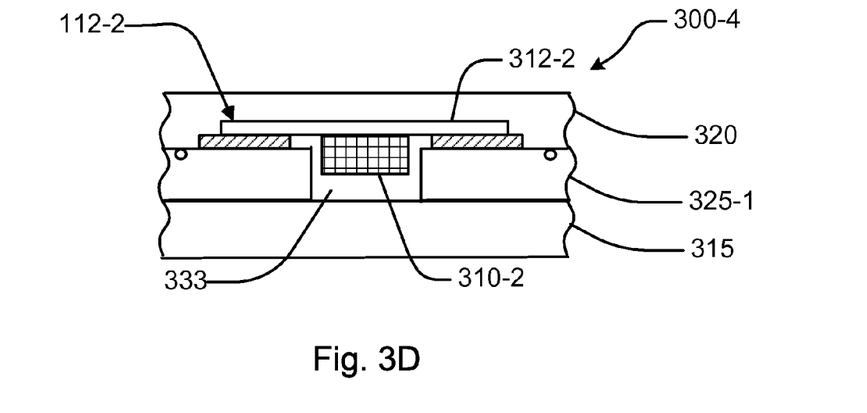

Referring next to FIG. 3D, a fourth cross section 300-4 includes the substrate layer 315, the single intermediate layer 325-1 and an upper laminate layer 320. The inverted IC module 112-2 is attached to the traces 108 that are formed on the single intermediate layer 325-1, as in the second cross section 300-2. The single intermediate layer 325-1 defines a cutout area 333 configured to allow insertion of a portion of the IC chip 310-2. The upper laminate layer 320 is formed to flow over the lead frame 312-2 and the traces 108 to define a smooth upper surface and to encase the IC module within the cutout 333.

The cross sections 300-1, 300-2, 300-3 and 300-4 are exemplary only and other combinations of substrates, intermediate layers, upper layers and cutouts can be combined to arrive at different cross sections. Any of the traces 108 in the cross sections 300 can be formed directly on the underlying layer, or formed on a singulated carrier 116 and attached to the underlying layer with the singulated carrier 116.

Figure 4A:
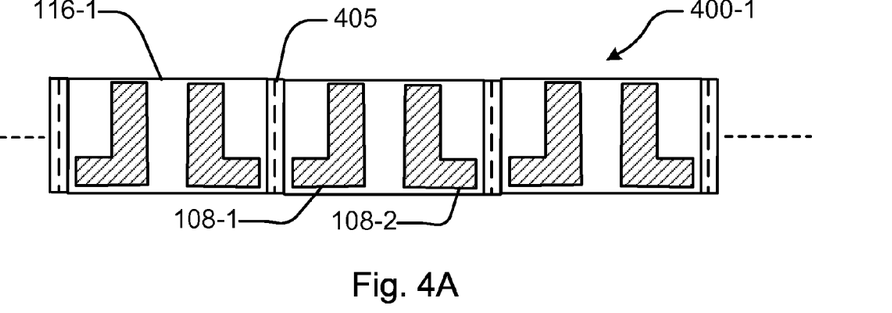
FIGS. 4A and 4B depict examples of rolls or coils of singulated carriers that could be utilized in forming smartcard inlays in accordance with the disclosure.

Referring next to FIG. 4A, a singulated carrier strip 400-1 includes multiple singulated carriers 116-1. Traces 108-1 and 108-2 are formed on each of the singulated carriers 116-1. The individual singulated carriers 116-1 can be separated from each other by administering a tension along perforations 405 or separated by cutting or stamping. The traces 108 can be formed of aluminum or copper that is etched onto the carrier strip 400-1. The carrier strip 400-1 can be composed of plastic (e.g., PET), circuit board, kapton tape, covar or mylar. If the singulated carriers 116 will be exposed to hot welding, e.g., when the IC module 112 is attached to the singulated carrier 116-1, the carrier strip 400-1 could be mylar or covar. If a conductive epoxy is to be used to attach the IC module 112, then PET plastic or kapton tape could be used.

Figure 4B:
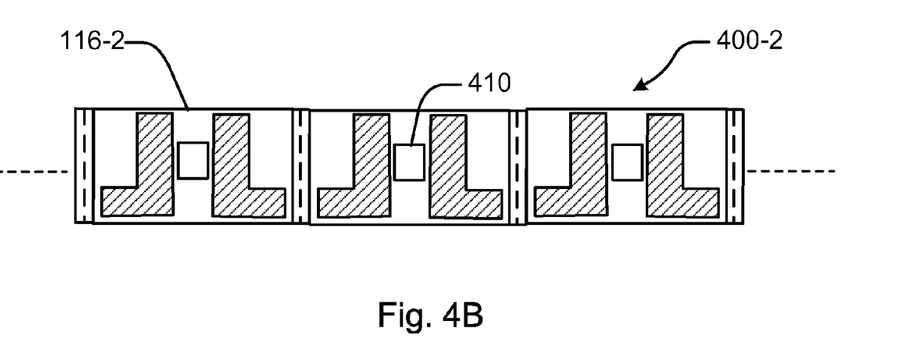

Referring next to FIG. 4B, a second carrier strip 400-2 includes singulated carriers 116-2. The singulated carriers 116-2 include cutout portions 410 configured to allow insertion of a portion of an IC module 112. The cutout 410 could be formed by stamping before or after the traces 108-1 and 108-2 are applied to the carrier strip 400-2.

The carrier strips 400 could also be formed with vias in the carrier strip 400. The vias would be positioned under the traces 108 such that the traces 108 could contact the lead wires 110 that are formed on the substrate 100 when the singulated carrier 116 is attached to the substrate 100. The vias allow electrical contact between the lead wires 110 and the traces 108.

Figure 5:
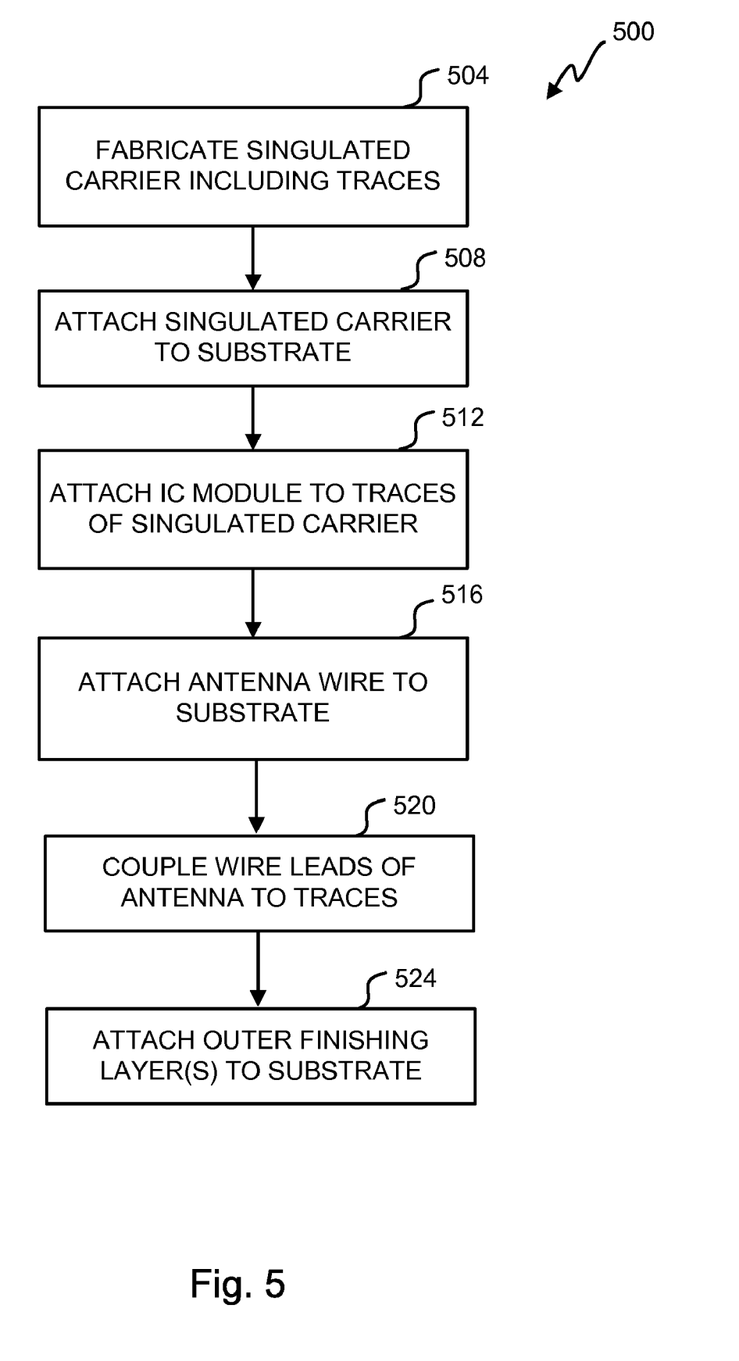
FIG. 5 is a flow diagram of an embodiment of a process for forming smartcards including smartcard inlays in accordance with the disclosure.

Referring next to FIG. 5, a process 500 for forming a smartcard including a smart card inlay in accordance with the disclosure includes the stages shown. The process 500 is exemplary. The stages shown can be omitted, rearranged and other stages added.

The process 500 starts at stage 504 by fabricating singulated carriers 116. Traces 108 are etched, printed or silk screened onto a carrier strip 400. Alternatively, the traces 108 can be stamped out of adhesive backed foil (e.g., aluminum or copper) and attached to the carrier strip 400. The traces 108 can be comprised of aluminum, copper or silver plated copper. Cutouts, if any are needed are made at stage 504 before or after the traces 108 are formed. The cutouts can be punched out. Vias in the carrier strip 400 can be formed at stage 504. The carrier strip 400 of singulated carriers 116 can be in roll or sheet form.

Upon fabricating the singulated carriers 116 at stage 504, the process 500 continues to stage 508 where the singulated carriers are attached to a smartcard inlay layer. The inlay layer can be a substrate layer 315 or an intermediate layer 325, depending on the design of the smart card. The singulated carriers 116 can be attached by unwinding the carrier strip 400 and pressing the adhesive backed singulated carriers onto the inlay layer at the position where the IC module and wire leads will connect with the traces 108. If the singulated carriers are not adhesive backed, an adhesive can be applied to the inlay layer or the singulated carrier 116 prior to attachment.

At stage 512, an IC module 112 is attached to the singulated carrier 116 such that the lead frame 312 contacts the traces 108. The IC module 112 can by attached using cold soldering such that the inlay layer is not damaged. Alternatively, the IC module could be pasted to the singulated carrier 116. Pasting is not as durable as soldering, but can be used for cards with a limited life span such as fare cards.

At stage 516, the antenna wire 104 is attached to the inlay layer. The antenna wire 104 can be embedded in the inlay layer or attached on the inlay layer using an adhesive. The antenna wire 104 can be embedded using an ultrasonic horn or by thermal compression. The wire leads 110 of the antenna wire 104 are not embedded into or pasted on the traces 108 to avoid damaging the traces 108. Instead, the wire leads 110 are embedded or pasted on both sides of the traces 108 such that the wire leads 110 are positioned directly over the traces 108.

At stage 520 the wire leads 110 of the antenna wire 104 are attached to the traces 108. The wire leads 110 can be attached to the traces 108 using cold soldering. At stage 524, the outer finishing layers of the smartcard are attached to the inlay layer. The finishing layers can include any of the layers 315, 320, 325 and 330 depicted in the FIGS. 3A, 3B, 3C and 3D.

Figure 6:
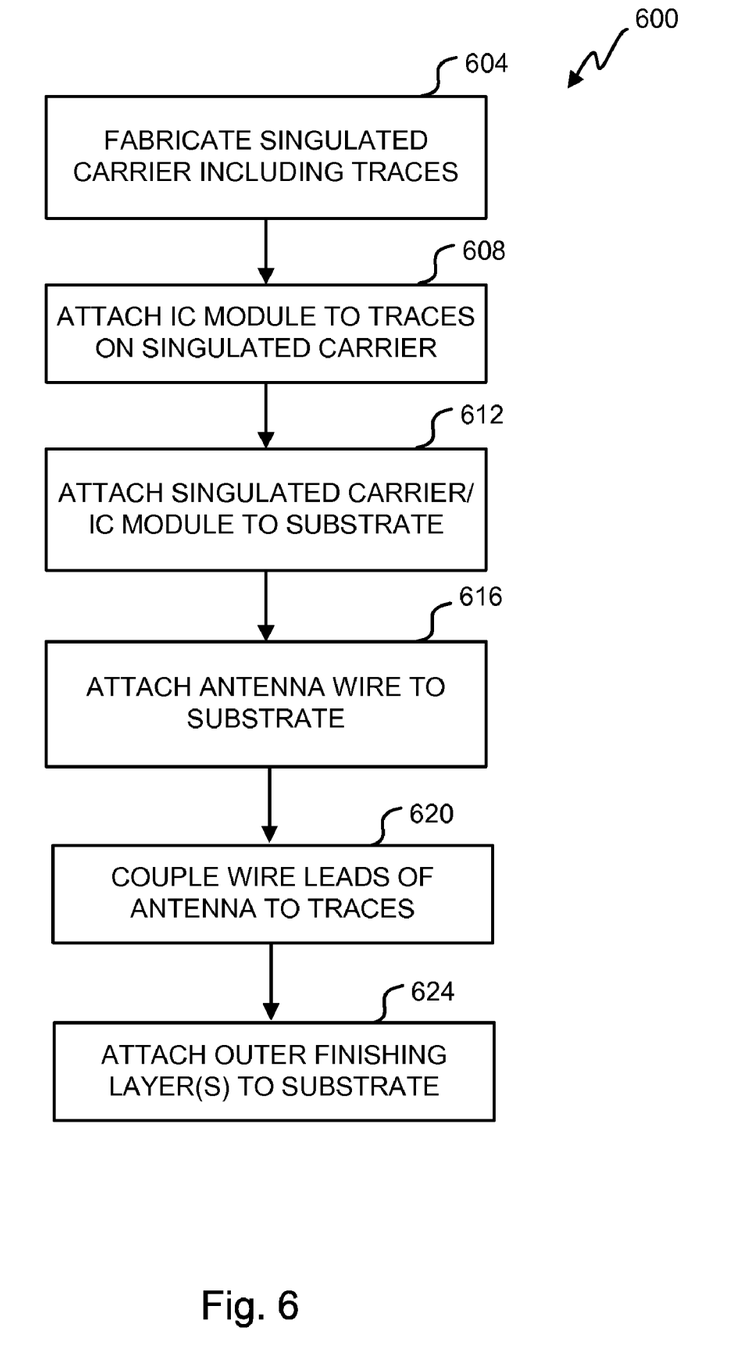
FIG. 6 is a flow diagram of another embodiment of a process for forming smartcards including smartcard inlays in accordance with the disclosure.

Referring to FIG. 6, another process 600 for forming a smartcard including a smart card inlay in accordance with the disclosure includes the stages shown. The process 600 is exemplary. The stages shown can be omitted, rearranged and other stages added.

The stages 604, 616, 620 and 624 can be the same as the stages 504, 516, 520 and 524, respectively, of the process 500. The process 600 differs from the process 500 in that the IC module 112 is attached to the traces 108 at stage 608 prior to the singulated carrier 116 being attached to the inlay layer at stage 612. The IC module 112 can be hot soldered to the traces 108 in an offline process (away from the inlay layer) such that the hot soldering does not damage the inlay layer.

Figure 7:
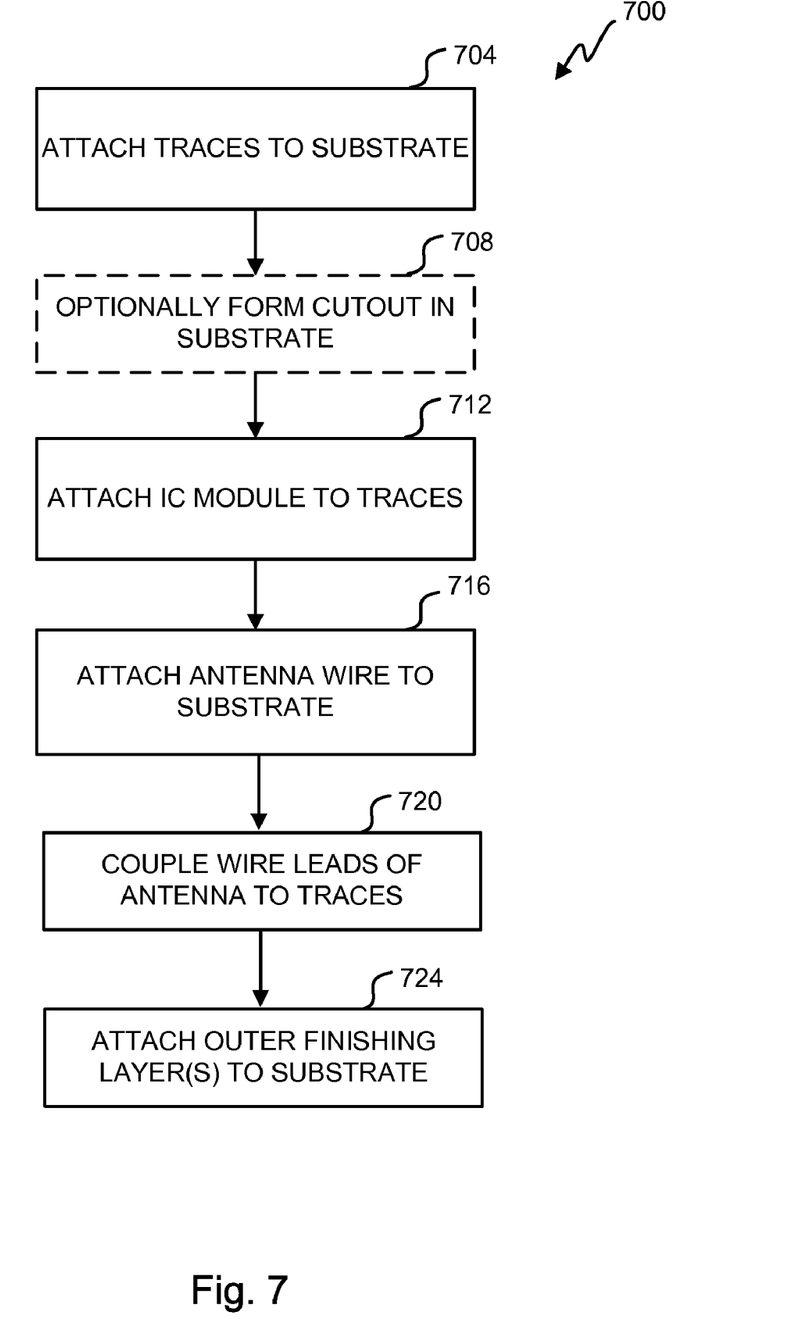
FIG. 7 is a flow diagram of yet another embodiment of a process for forming smartcards including smartcard inlays in accordance with the disclosure.

Referring to FIG. 7, another process 700 for forming a smartcard including a smart card inlay in accordance with the disclosure includes the stages shown. The process 700 is exemplary. The stages shown can be omitted, rearranged and other stages added.

The process 700 starts at stage 704 where the traces 108 are attached to the smartcard inlay layer (i.e., a substrate). The traces 108 could be attached by attaching a simulated carrier 116 that includes the traces 108 as in the stages 504 and 604 of the process 500 and 600. Alternatively, the traces 108 can be attached to the inlay layer by etching, printing and/or silkscreening.

At optional stage 708, a cutout is formed in the inlay layer to allow insertion of at least a portion of the IC module 112. The cutouts 329 and 333 illustrated in FIGS. 3C and 3D are examples of cutouts that could be formed at the stage 708, The cutout can be performed prior to attaching the traces 108 at stage 704. Stages 712, 716, 720 and 724 are the same as the stages 512/612, 516/616, 520/620 and 524/624, respectively, of the processes 500 and 600.

While the principles of the disclosure have been described above in connection with specific apparatuses and methods, it is to be clearly understood that this description is made only by way of example and not as limitation on the scope of the disclosure.

What is claimed is:

1. An inlay for a smartcard, the inlay comprising:
   a substrate;
   a first trace attached to the substrate;
   a second trace attached to the substrate; and
   an antenna with a first end and a second end, wherein:
   the first end is coupled to a first area of the first trace, and the second end is coupled to a first area of the second trace,
   wherein a second area of the first trace and a second area of the second trace are configured to be coupled to an integrated circuit (IC) or IC module;
   wherein the first area of the first trace is located away from the second area of the first trace and the first area of the second trace is located away from the second area of the second trace;
   wherein the first area of the first trace comprises a first length in a first direction and a first width, and the second area of the first trace comprises a second length in a second direction and a second width;
   wherein the first direction is different than the second direction; and
   wherein the first length is greater than the first width, the second length is greater than the second width.

2. The inlay for the smartcard as recited in claim 1, wherein the substrate comprises a cutout sized to allow at least partial insertion of the IC or IC module.

3. The inlay for the smartcard as recited in claim 1, wherein the IC module comprises a carrier and an integrated circuit.

4. The inlay for the smartcard as recited in claim 1, wherein at least one of the first trace or the second trace is formed on a singulated carrier and the singulated carrier is attached to the substrate.

5. The inlay for the smartcard as recited in claim 4, wherein the singulated carrier comprises a cutout sized to allow at least partial insertion of the IC or IC module.

6. The inlay for the smartcard as recited in claim 1, wherein the first and second traces are silkscreened, printed or etched.

7. The inlay for the smartcard as recited in claim 1, wherein the first trace comprises a solder bump configured to electrically couple to the IC module or IC.

8. The inlay for the smartcard as recited in claim 1, wherein the second trace comprises a solder bump configured to electrically couple the second end to the second trace.

9. The inlay for the smartcard as recited in claim 1, wherein the IC module comprises a carrier and a plurality of integrated circuits.

10. The inlay for the smartcard as recited in claim 1, wherein the antenna is embedded into the substrate.

11. The inlay for the smartcard as recited in claim 1, wherein the antenna is mandrel wound.

12. A method for assembling an inlay of a smartcard, the method comprising:
    attaching a first trace to a substrate;
    attaching a second trace to the substrate;
    attaching an antenna wire to the substrate;
    coupling a first end of the antenna wire to a first area of the first trace; and
    coupling a second end of the antenna wire to a first area of the second trace;
    wherein a second area of the first trace and a second area of the second trace are configured to be coupled to an integrated circuit (IC) or IC module;
    wherein the first area of the first trace is located away from the second area of the first trace and the first area of the second trace is located away from the second area of the second traces;
    wherein the first area of the first trace comprises a first length in a first direction and a first width, and the second area of the first trace comprises a second length in a second direction and a second width;
    wherein the first direction is different than the second direction; and
    wherein the first length is greater than the first width, the second length is greater than the second width.

13. The method for assembling the inlay of the smartcard as recited in claim 12, further comprising forming a cutout in the substrate, the cutout being sized to allow at least partial insertion of the IC or IC module.

14. The method for assembling the inlay of the smartcard as recited in claim 13, wherein at least one of the first trace or the second trace is formed on a singulated carrier and attaching at least one of the first or the second trace comprises attaching the singulated carrier to the substrate.

15. The method for assembling the inlay of the smartcard as recited in claim 14, further comprising:
    forming at least one of the first trace or the second trace on the singulated carrier prior to attaching the singulated carrier to the substrate.

16. The method for assembling the inlay of the smartcard as recited in claim 13, further comprising attaching the IC module or IC to the first and second traces.

17. The method for assembling the inlay of the smartcard as recited in claim 13, wherein attaching the antenna comprises embedding a plurality of windings of the antenna into the substrate.

18. The method for assembling the inlay of the smartcard as recited in claim 13, wherein attaching the antenna comprises embedding a plurality of windings of the antenna into the substrate, wherein the embedding is done before the coupling of the first trace to the first end.

19. The method for assembling the inlay of the smartcard as recited in claim 13, wherein attaching the antenna comprises embedding a plurality of windings of the antenna into the substrate, wherein the embedding is done after the coupling of the first trace to the first end.

20. The method for assembling the inlay of the smartcard as recited in claim 13, wherein the antenna is mandrel wound and attaching the mandrel wound antenna to the substrate is done prior to the coupling of the first trace to the first end.

21. The method for assembling the inlay of the smartcard as recited in claim 13, further comprising:
attaching the IC or IC module to the second areas of the first and second traces,
wherein the coupling between the first and second traces and the antenna is done before attaching the IC module or IC.

* * * * *